(12) United States Patent
Wang et al.

(10) Patent No.: US 9,134,428 B2
(45) Date of Patent: Sep. 15, 2015

(54) METHOD AND APPARATUS FOR POWER CONTROL OF A LOCATION-BASED MOBILE DEVICE

(75) Inventors: Zhibi Wang, Woodridge, IL (US); Semyon B. Mizikovsky, Morganville, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 911 days.

(21) Appl. No.: 12/570,921

(22) Filed: Sep. 30, 2009

(65) Prior Publication Data

US 2011/0077027 A1 Mar. 31, 2011

(51) Int. Cl.
  G01S 19/05 (2010.01)
  G01S 19/34 (2010.01)
  H04W 4/20 (2009.01)
  H04W 4/02 (2009.01)
  H04W 52/02 (2009.01)

(52) U.S. Cl.
  CPC ............. *G01S 19/34* (2013.01); *G01S 19/05* (2013.01); *H04W 4/20* (2013.01); *H04W 4/02* (2013.01); *H04W 52/028* (2013.01); *H04W 52/0274* (2013.01)

(58) Field of Classification Search
  CPC ...... G01S 19/15; G01S 19/34; H04W 52/028; H04W 52/0274; H04W 4/02
  USPC ............... 340/988–995.28; 455/456.1–456.6, 455/572–574; 701/209–215
  See application file for complete search history.

(56) References Cited

U.S. PATENT DOCUMENTS

| 6,515,619 | B1* | 2/2003 | McKay, Jr. ............... 342/357.74 |
| 6,681,114 | B2* | 1/2004 | Chang et al. ............... 455/456.3 |
| 6,813,502 | B2* | 11/2004 | Son et al. .................. 455/456.3 |
| 7,599,794 | B2* | 10/2009 | Nou ............................ 701/484 |
| 2001/0019316 | A1* | 9/2001 | Hasegawa ................ 342/357.12 |
| 2003/0134626 | A1* | 7/2003 | Himmel et al. ............... 455/419 |
| 2009/0098880 | A1* | 4/2009 | Lindquist ................... 455/456.1 |

FOREIGN PATENT DOCUMENTS

JP    2000304841 A  * 11/2000

OTHER PUBLICATIONS

Leviton Manufacturing Company, DHC Universal Remote Controller Fact Sheet, 2003 (highlighted portions).*
Engish Translation (by machine) of Japanese Yamada patent reference 2000-304841A.*
English Language Abstract of Japanese Yamada patent reference 2000-304841A.*

* cited by examiner

Primary Examiner — Larry Sternbane
(74) Attorney, Agent, or Firm — Fay Sharpe LLP

(57) ABSTRACT

A technique to extend location-based (e.g. GPS) mobile device battery lifetime by reducing the location-based (e.g. GPS) circuitry power consumption is provided. The technique defines and controls when to start power and when to stop power to the device in the context of a mobile terminating (MT) location request and/or a mobile originated (MO) location request that is either on-demand or periodic.

21 Claims, 3 Drawing Sheets

METHOD AND APPARATUS FOR POWER CONTROL OF A LOCATION-BASED MOBILE DEVICE

FIELD OF THE INVENTION

This invention relates to a method and apparatus for location-based (e.g. Global Positioning System (GPS)) mobile power control.

BACKGROUND OF THE INVENTION

By way of background, there is typically no power control of a GPS device during usage so, once the GPS is powered-on, it will stay on continuously. This is significant because the use of GPS features in a mobile device (whether a stand-alone mobile GPS device or a communication device such as a wireless phone, etc.) consumes a relatively large amount of power.

In stand-alone GPS devices, excessive amounts of power are needed to register the device on the network, as well as constantly run the GPS functionality.

In communication devices where GPS is merely one of the features, the registration or log-on procedure is not as time consuming as for a stand-alone GPS device—because the device is typically already logged into the telecommunication network and may also be linked to satellite signals. Nonetheless, since the battery for an integrated GPS mobile device is shared by both the GPS functionality and mobile communication functionality, it is extremely important to control the battery power consumed by the GPS functionality.

Generally, there are at least two kinds of Location-based Services (LBS) that utilize GPS functionality in a mobile device: mobile originated (MO) LBS and mobile terminated (MT) LBS. For MO LBS, the LBS application is located in the mobile device and the LBS request is originated from the LBS application, e.g. a turn-by-turn directions application or other location-based application. For the MT LBS, the request for the mobile device location is initiated by an LBS application outside the mobile device, e.g., a fleet tracking application that tracks all vehicles (e.g. rented cars or taxis) of a fleet and shows their locations on the map.

SUMMARY OF THE INVENTION

A method and apparatus for location-based mobile power control are provided.

In one embodiment, a method implemented in a network having a location based services (LBS) server, a location-based services client, and a mobile device having location based functionality comprises sending a control message to the mobile device to activate power to the location based functionality of the mobile device for a fixed period of time, sending a mobile terminating (MT) location request to the mobile device during the fixed period of time based a request from the client, receiving a location report from the mobile device based on the mobile terminating (MT) location request and sending the location report to the client.

In another embodiment, the request from the client is a mobile terminating (MT) location request.

In another embodiment, the request from the client is sent to the LBS server on a periodic basis.

In another embodiment, the control message defines periodic activation of power for the location based functionality.

In another embodiment, the control message is sent on-demand based on the request from the client.

In another embodiment, a system comprises a location-based services client, a mobile device having location based functionality and a location based services (LBS) server operative to send a control message to the mobile device to activate power to the location based functionality of the mobile device for a fixed period of time, send a mobile terminating (MT) location request to the mobile device during the fixed period of time based a request from the client, receive a location report from the mobile device based on the mobile terminating (MT) location request and send the location report to the client.

In another embodiment, the request from the client is a mobile terminating (MT) location request.

In another embodiment, the request from the client is sent to the LBS server on a periodic basis.

In another embodiment, the control message defines periodic activation of power for the location based functionality.

In another embodiment, the control message is sent on-demand based on the request from the client.

In another embodiment, the location based functionality is Global Positioning System functionality.

In another embodiment, a method implemented in a network having a location based services (LBS) server and a mobile device having location based functionality comprises activating power to the location based functionality of the mobile device for a fixed period of time, sending a mobile originating (MO) location request from the mobile device, de-activating power to the location based functionality of the mobile device after sending the mobile originating (MO) location request, receiving the mobile originating (MO) location request by the LBS server and sending a location report to the mobile device based on the mobile originating (MO) location request.

In another embodiment, the method further comprises selectively activating power to the location based functionality of the mobile device after receiving the location report by the mobile device.

In another embodiment, the activating and de-activating are accomplished in a periodic manner.

In another embodiment, the activating and de-activating are accomplished on an on-demand basis.

In another embodiment, a system comprises a mobile device having location based functionality, the mobile device being operative to activate power to the location based functionality for a fixed period of time, send a mobile originating (MO) location request, de-activate power to the location based functionality after sending the mobile originating (MO) location request and a location based services (LBS) server operative to receive the mobile originating (MO) location request and send a location report to the mobile device based on the mobile originating (MO) location request.

In another embodiment, the mobile device is operative to selectively activate power to the location based functionality of after receiving the location report by the mobile device.

In another embodiment, the activating and de-activating are accomplished in a periodic manner.

In another embodiment, the activating and de-activating are accomplished on an on-demand basis.

In another embodiment, the location based functionality is Global Positioning System (GPS) functionality.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

According to the presently described embodiments, circuitry power for GPS (or any other location based system) in a mobile device is controlled such that the power to the GPS (or other location based) circuitry is supplied (or activated) before (e.g. immediately before) the location request for a fixed or predetermined period or periods of time, with some allowance for the GPS (or other location based system) to lock-on to satellite signals. After the mobile device completes its tasks related to the location request, the GPS (or other location based system) circuitry power is turned off (or de-activated) to save battery power. For ease of reference throughout, it should be appreciated that, although GPS is the system described herein, the presently described embodiments may be applied to any location based system, particularly where location based functionality in the mobile device is powered in manners similar to the powering of GPS functionality.

For periodic location service for MT LBS, in one form, a control message including the starting time, period, and ending time for GPS power is sent from the location server in the network to the mobile device—before the location request. In one form, the control message also includes satellite information to help the GPS circuit lock on to the satellites quickly. In at least one form, the GPS circuitry power will be controlled from functionality that is located inside the mobile device. Also, a suitable control message may be sent to activate GPS power on an on-demand basis rather than to establish periodic power activation.

Similarly, for mobile originated LBS, in one form, the LBS application inside the mobile device knows when the location information will be requested. Therefore, the power control functionality inside the mobile device controls the GPS circuitry power in either an on-demand or periodic manner.

Figure 1:
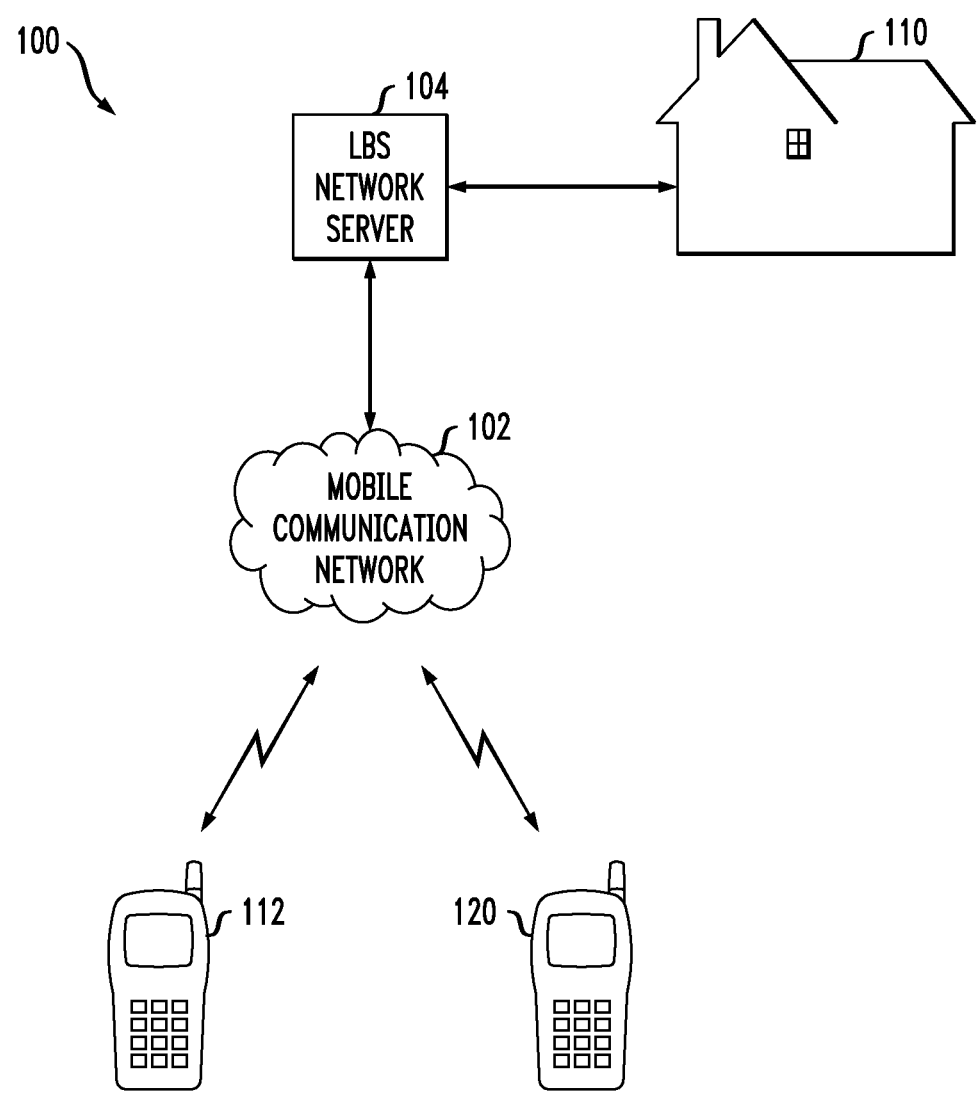
FIG. 1 is an illustration of a network into which the presently described embodiments may be implemented.

Referring now to the drawings wherein the showings are for purposes of illustrating the exemplary embodiments only and not for purposes of limiting the claimed subject matter, FIG. 1 provides a view of a system into which the presently described embodiments may be incorporated. As shown generally, FIG. 1 illustrates a network 100. The network 100 includes a mobile communications network 102 and a LBS network server 104.

It should be appreciated that the LBS network server 104 is in communication with the mobile communications network 102 in manners that are well known in the art. It should also be appreciated that the mobile communications network 102 and the LBS network server 104 may take a variety of forms. For example, the mobile communications network 102 may be a 3G network while the LBS network server 104 may be a stand-alone server, may reside in a switching element such as a mobile switching center (MSC), or may reside within another application server.

Also shown functioning within the network 100 are a client 110, a mobile device 112, and a mobile device 120. These devices may take a variety of forms. For example, the client 110 may be a location-based services (LBS) client and/or take the form of a personal computer, a mobile phone or other personal mobile computing or communication device. The mobile devices 112 and 120 may be mobile phones or other personal mobile computing or communication devices, or stand-alone GPS devices. In any form, these devices are configured to implement the present invention.

According to the presently described embodiments, battery life for the mobile devices 112 and 120 can be extended by controlling the power that is provided to the GPS functionality within each of these devices. As will be appreciated, such control can be accomplished in a number of ways and in a number of different environments as will be described.

More specifically, in one form, the presently described embodiments may advantageously be used when a mobile terminating (MT) location request is sent from a client device to locate a mobile device. In this regard, mobile terminating (MT) location requests are used where a separate client, such as client 110, seeks the location of a mobile device, such as mobile device 112. Mobile terminating (MT) location requests are used in many situations including e911 situations, or tracking situations such as in a fleet tracking system or a parental child tracking application.

In operation, in this form, the client 110 sends a mobile terminating (MT) location request to the LBS server 104. The LBS server 104 then communicates the mobile terminating (MT) location request to the mobile device 112 through the mobile communications network 102. The mobile device 112, as is well known, calculates its location and sends appropriate information (e.g. a location report) back to the LBS server 104 through the mobile communications network 102. The client 110 then receives the location report.

In this process, according to the presently described embodiments, power to the GPS functionality or circuits of the mobile device 112 is only turned on or activated when needed for fixed or predetermined period(s) of time. This can be accomplished in a variety of ways including in an on-demand manner or in a periodic manner.

In an on-demand situation, the LBS network server 104 sends a control message to the mobile device 112 to turn power on prior to sending the location request. The control message dictates to the mobile device 112 the sequence of turning power on and turning power off to the GPS functionality so that the mobile device can perform GPS functions but not waste power.

In a periodic situation, the LBS network server 104 sends a control message to the mobile device 112 with information on a starting time, periods, and ending time for powering the GPS functions.

In either case, the mobile device 112, in at least one form, runs a suitable software routine to implement the parameters of the control message sent to the mobile device by the LBS network server. The routine may take a variety of forms, reside in any suitable location and be run by any suitable control processor on the mobile device. Of course, the routine will appropriately interact with necessary hardware.

In another form, the presently described embodiments may be applied to situations involving mobile originating (MO) location requests. In these situations, a mobile device, such as mobile device 112, sends a mobile originating (MO) location request to the network, e.g. the LBS network server 104, through a mobile communications network, such as network 102. The LBS network server 104 responds with the appropriate information to the mobile device 120 through the communications network 102.

According to the presently described embodiments, GPS functionality within the mobile device 120 is only activated or powered when the mobile originating (MO) location request is issued. After the request is sent, the power for the GPS functionality is turned off. In this situation, the mobile device 120 controls its own power for the GPS functionality. There may also be situations where periodic activation of the GPS functionality is desired. In either case, similar to the device 112 as described above, software routines within the mobile device 120 are used to turn the power on and/or turn the power off in a desired manner.

Figure 2:
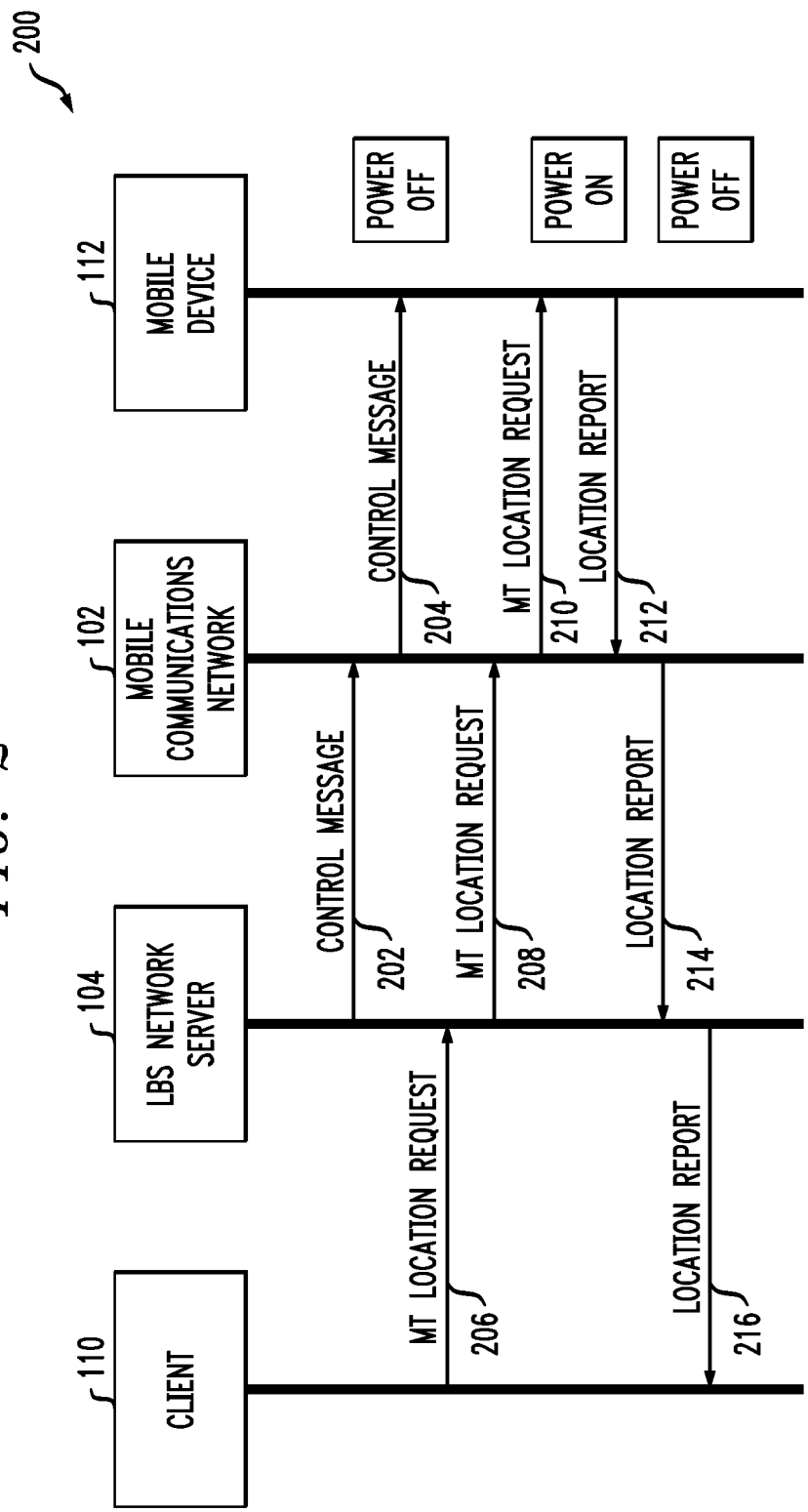
FIG. 2 is a call flow diagram according to the presently described embodiments; and, FIG. 3 is a call flow diagram according to the presently described embodiments.

Referring now to FIG. 2, a call flow diagram 200 is illustrated. In this regard, a network server 104 sends a control message to the mobile device 112 through the communication network 102 (at 202 and 204). As noted above, this control message can be sent in either an on-demand or a periodic manner. It should be appreciated this control message may take a variety of forms but, in at least one form, includes information on a starting time, a period, and an ending time for power activation of the GPS functionality of the mobile device 112. If on-demand, the period may not be necessary.

In either event, at a subsequent point, the client 110 sends a mobile terminating (MT) location request to the LBS network server 104 (at 206). The request is forwarded to the mobile device 112 through the communications network 102 (at 208 and 210). A location response is then sent back to the client 110 by the mobile device 112 through the communications network 102 and LBS network server 104 (at 212, 214 and 216).

Notably, as shown, it should be appreciated that whether on-demand or periodic, the power to the GPS functionality in the mobile device 112 is selectively turned on and off. In this way, power is only turned on or activated when needed in accord with the content of the control message.

Figure 3:
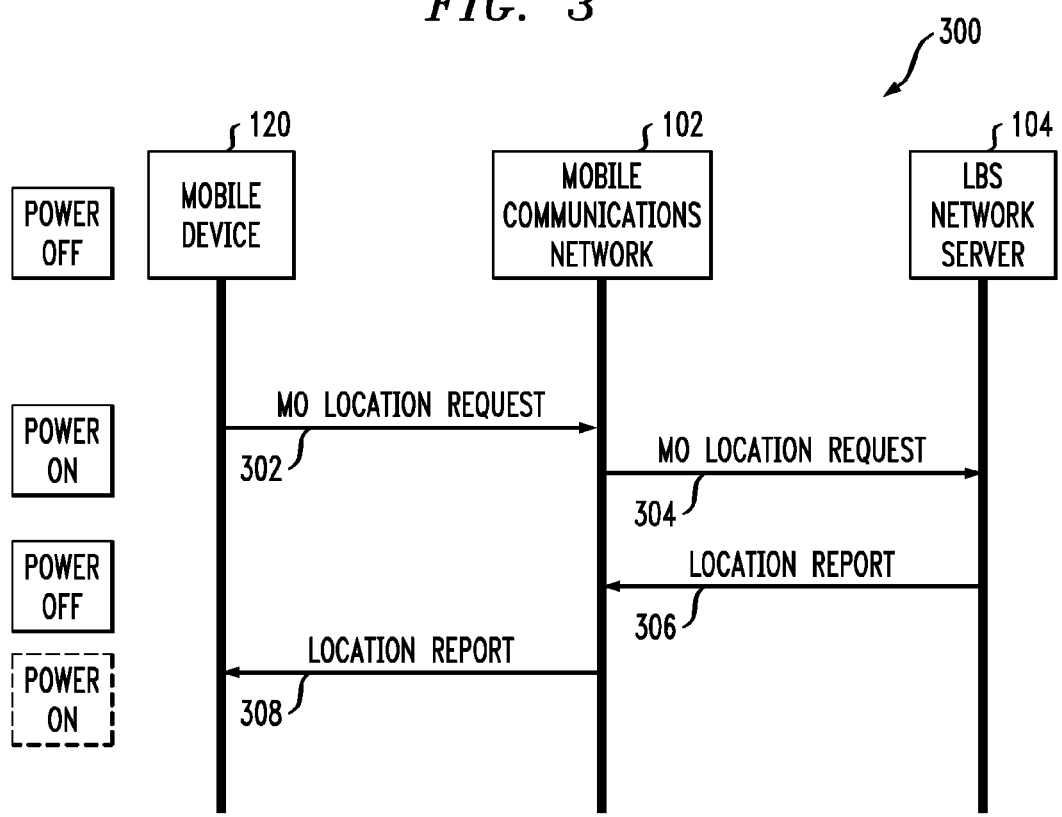

With reference now to FIG. 3, a call flow diagram 300 according to the presently described embodiments is illustrated. As shown, the mobile device 120 sends a mobile originating (MO) location request to a LBS network server 104 through the communications network 102 (at 302 and 304). The LBS network server 104 responds to the mobile device 120 with a location report through the communication network 102 (at 306 and 308). Notably, according to the presently described embodiments, the GPS functionality of the mobile device 120 is only activated when needed, as shown. Typically, this will occur in an on-demand basis; however, periodic activation of the GPS functionality may also be desired in some situations. It should be appreciated that the power to the GPS functionality in the mobile device may be activated after the receipt of the location report depending on a variety of factors including the architecture and functions of the mobile device and design of the network.

One alternative embodiment of the presently described embodiments is to apply the solution to the WiMAX technology. In this form, the user device is a WiMAX terminal that has GPS capability and the LBS application may be a third party service provider that does not provide the network services. The location server is in the mobile device's home CSN (Connectivity Services Network). The location register is located in the WiMAX user's home AAA. The solution can be used for the periodic location request from the LBS application and MO LBS service.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method implemented in a network having a location based services server, a location-based services client and a mobile device having location based functionality, the method comprising:
   sending a control message having information dictating a start time and a period for a power sequence to the mobile device to activate power to the location based functionality of the mobile device;
   sending a mobile terminating location request to the mobile device during the period based on a request from the client;
   receiving a location report from the mobile device based on the mobile terminating location request; and
   sending the location report to the client.

2. The method as set forth in claim 1 wherein the request from the client is a mobile terminating location request.

3. The method as set forth in claim 2 wherein the request from the client is sent to the location-based services server on a periodic basis.

4. The method as set forth in claim 1 wherein the control message defines periodic activation of power for the location based functionality.

5. The method as set forth in claim 1 wherein the control message is sent on-demand based on the request from the client.

6. A system comprising:
   a location-based services client; and
   a location based services server operative to send a control message having information dictating a start time and a period for a power sequence to a mobile device to activate power to location based functionality of the mobile device, send a mobile terminating location request to the mobile device during the period based on a request from the client, receive a location report from the mobile device based on the mobile terminating location request and send the location report to the client.

7. The system as set forth in claim 6 wherein the request from the client is a mobile terminating location request.

8. The system as set forth in claim 7 wherein the request from the client is sent to the location-based services server on a periodic basis.

9. The system as set forth in claim 6 wherein the control message defines periodic activation of power for the location based functionality.

10. The system as set forth in claim 6 wherein the control message is sent on-demand based on the request from the client.

11. A method implemented in a network having a location based services server and a mobile device having location based functionality, the method comprising:
    activating power to the location based functionality of the mobile device for a fixed period of time, the fixed period of time including a start time and an end time;
    sending a mobile originating location request from the mobile device;
    receiving a location report at the mobile device based on the mobile originating location request.

12. The method as set forth in claim 11 further comprising selectively activating power to the location based functionality of the mobile device after receiving the location report by the mobile device.

13. The method as set forth in claim 11 wherein the activating and de-activating are accomplished in a periodic manner.

14. The method as set forth in claim 11 wherein the activating and de-activating are accomplished on an on-demand basis.

15. A system comprising:
- a mobile device having location based functionality, the mobile device being operative to activate power to the location based functionality for a fixed period of time, and send a mobile originating location request,
- and wherein the fixed period of time includes a start time and an end time.

16. The system as set forth in claim 15 wherein the mobile device is operative to selectively activate power to the location based functionality of the mobile device after receiving a location report at the mobile device.

17. The system as set forth in claim 15 wherein the activating and de-activating are accomplished in a periodic manner.

18. The system as set forth in claim 15 wherein the activating and de-activating are accomplished on an on-demand basis.

19. The system as set forth in claim 6 wherein the location based functionality is Global Positioning System functionality.

20. The system as set forth in claim 15 wherein the location based functionality is Global Positioning System functionality.

21. The system as set forth in claim 15 further comprising a location based services server operative to receive the mobile originating location request and send a location report to the mobile device based on the mobile originating location request.

* * * * *